US010692217B2

(12) United States Patent
Zhao (10) Patent No.: US 10,692,217 B2
(45) Date of Patent: Jun. 23, 2020

(54) IMAGE PROCESSING METHOD AND IMAGE PROCESSING SYSTEM

(71) Applicant: Sercomm Corporation, Taipei (TW)

(72) Inventor: Shao-Hai Zhao, Jiangsu Province (CN)

(73) Assignee: SERCOMM CORPORATION, Taipei (TW)

( * ) Notice: Subject to any disclaimer, the term of this patent is extended or adjusted under 35 U.S.C. 154(b) by 108 days.

(21) Appl. No.: 15/398,000

(22) Filed: Jan. 4, 2017

(65) Prior Publication Data

US 2017/0262998 A1 Sep. 14, 2017

(30) Foreign Application Priority Data

Mar. 14, 2016 (CN) .......................... 2016 1 0142680

(51) Int. Cl.
*G06T 7/11* (2017.01)
*G06T 7/215* (2017.01)
*G06K 9/62* (2006.01)
*G06K 9/32* (2006.01)

(52) U.S. Cl.
CPC .............. *G06T 7/11* (2017.01); *G06K 9/3233* (2013.01); *G06K 9/6264* (2013.01); *G06T 7/215* (2017.01); *G06T 2207/10016* (2013.01); *G06T 2207/20081* (2013.01); *G06T 2210/22* (2013.01)

(58) Field of Classification Search
CPC ...... G06K 9/6264; G06K 9/3233; G06T 7/11; G06T 7/215
See application file for complete search history.

(56) References Cited

U.S. PATENT DOCUMENTS

| 6,061,014 | A | 5/2000 | Rautanen et al. |
| 7,602,944 | B2 | 10/2009 | Campbell et al. |
| 9,129,385 | B2* | 9/2015 | Xie ....................... G06T 7/0085 |
| 9,208,554 | B2 | 12/2015 | Shehata et al. |
| 9,779,331 | B2* | 10/2017 | Bulan ....................... G06K 9/66 |
| 9,801,550 | B2* | 10/2017 | Ferrantelli ............ A61B 5/0077 |
| 9,819,865 | B2* | 11/2017 | Evans, V ............ H04N 5/23238 |
| 9,928,596 | B2* | 3/2018 | Beall ....................... G06N 7/005 |
| 2004/0120581 | A1 | 6/2004 | Ozer et al. |
| 2009/0087085 | A1* | 4/2009 | Eaton ...................... G06F 15/16 382/159 |
| 2009/0252435 | A1* | 10/2009 | Wen ................... G06K 9/00228 382/284 |

(Continued)

FOREIGN PATENT DOCUMENTS

| CN | 101216885 A | 7/2008 |
| CN | 101867699 A | 10/2010 |

(Continued)

OTHER PUBLICATIONS

CN Office Action dated Aug. 3, 2018 in corresponding Chinese application (No. 201610142680.X).

(Continued)

*Primary Examiner* — Mia M Thomas
(74) *Attorney, Agent, or Firm* — McClure, Qualey & Rodack, LLP (57) ABSTRACT

An image processing method and an image processing system are provided. A plurality of image detections are performed on the regions, such that the detections on the image data can adequately meet the variety of needs.

10 Claims, 8 Drawing Sheets

(56) References Cited

U.S. PATENT DOCUMENTS

| | | | | |
|---|---|---|---|---|
| 2009/0263021 | A1* | 10/2009 | Takamori | G06K 9/00771 382/181 |
| 2010/0002071 | A1 | 1/2010 | Ahiska | |
| 2011/0050939 | A1* | 3/2011 | Tsurumi | G06K 9/00228 348/222.1 |
| 2012/0033896 | A1* | 2/2012 | Barrows | G06T 7/223 382/295 |
| 2012/0327241 | A1 | 12/2012 | Howe | |
| 2013/0114703 | A1 | 5/2013 | DeForest et al. | |
| 2013/0230099 | A1 | 9/2013 | DeForest et al. | |
| 2013/0242079 | A1* | 9/2013 | Zhou | G02B 21/367 348/80 |
| 2013/0259385 | A1* | 10/2013 | Xie | G06T 7/0085 382/199 |
| 2013/0286193 | A1* | 10/2013 | Pflug | B60R 1/00 348/135 |
| 2014/0177946 | A1 | 6/2014 | Lim et al. | |
| 2014/0355829 | A1 | 12/2014 | Heu et al. | |
| 2014/0369417 | A1 | 12/2014 | Shi et al. | |
| 2015/0125032 | A1 | 5/2015 | Yamanaka et al. | |
| 2015/0269427 | A1 | 9/2015 | Kim et al. | |
| 2015/0310624 | A1 | 10/2015 | Bulan et al. | |
| 2017/0126972 | A1* | 5/2017 | Evans, V | G06T 3/4038 |
| 2017/0280055 | A1* | 9/2017 | Kaida | H04N 5/23251 |
| 2018/0013953 | A1* | 1/2018 | Evans, V | G06T 3/0062 |
| 2018/0211104 | A1* | 7/2018 | Zhao | G06K 9/3233 |
| 2018/0330510 | A1* | 11/2018 | Watanabe | G06T 7/246 |
| 2019/0005654 | A1* | 1/2019 | Takahashi | G06T 5/50 |

FOREIGN PATENT DOCUMENTS

| | | |
|---|---|---|
| CN | 101901334 A | 12/2010 |
| CN | 102004918 A | 4/2011 |
| CN | 102955929 A | 3/2013 |
| CN | 103150552 A | 6/2013 |
| CN | 104364824 A | 2/2015 |
| CN | 104427337 A | 3/2015 |
| CN | 102750527 B | 8/2015 |
| CN | 104866842 A | 8/2015 |
| CN | 105118072 A | 12/2015 |

OTHER PUBLICATIONS

CN Office Action dated Aug. 2, 2019 in corresponding with Chinese application (No. 201610142680.X), pp. 1-6.
CN Office Action dated Mar. 5, 2019 in corresponding Chinese application (No. 201610142680.X).

* cited by examiner

IMAGE PROCESSING METHOD AND IMAGE PROCESSING SYSTEM

This application claims the benefit of People's Republic of China application Serial No. 201610142680.X, filed Mar. 14, 2016, the disclosure of which is incorporated by reference herein its entirety.

TECHNICAL FIELD

The disclosure relates in general to a processing method and a processing system, and more particularly to an image processing method and an image processing system.

BACKGROUND

Along with the development of the image processing technology, various image detections, such as people detection, objection detection, motion detection and car detection, are invented. Those image detections are widely used for several applications, such as environmental monitoring, driving recording, or web video chatting.

However, in some of the applications, if only one kind of image detections is performed for the whole frame of the image data, it does not adequately meet the variety of needs. Thus, this issue causes a major bottleneck of the development of the image processing technology.

SUMMARY

The disclosure is directed to an image processing method and an image processing system, a plurality of image detections are performed on a plurality of regions of an image data, such that the detections on the image data can adequately meet the variety of needs.

According to an embodiment, an image processing method is provided. The image processing method includes the following steps: An image data is cropped to obtain a plurality of regions. A plurality of image detections are performed on the regions.

According to another embodiment, an image processing system is provided. The image processing system includes a cropping unit and a processing unit. The cropping unit is for cropping an image data to obtain a plurality of regions. The processing unit is for performing a plurality of image detections on the regions.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In one embodiment of the present invention, a plurality of image detections are performed on a plurality of regions of an image data, such that the detections on the image data can adequately meet the variety of needs.

Figure 1:
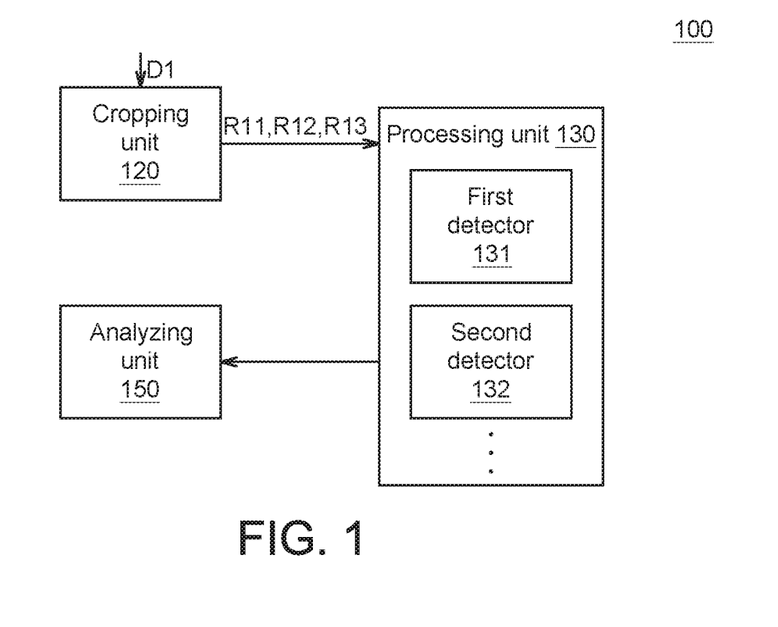
FIG. 1 shows an image processing system according to one embodiment.

Please refer to FIG. 1, which shows an image processing system 100 according to one embodiment. For example, the image processing system 100 may be a webcam, a video camera, an Internet Protocol camera, a computer, a computer cluster, or a system composed of a video camera and a server.

The image processing system 100 includes a cropping unit 120, a processing unit 130 and an analyzing unit 150. The image processing system 100 is used for processing an image data D1. The image data D1 may be obtained from a network interface, a storage unit or an image sensor.

The cropping unit 120 is used for performing a frame cropping process. The processing unit 130 is used for performing various image detections. The analyzing unit 150 is used for analyzing the result of the image detections performed by the processing unit 130 to determine whether an event is needed to be recorded or reported. Each of the cropping unit 120, the processing unit 130 and the analyzing unit 150 may be a circuit, a chip, a circuit board, a computer, or a storage device storing a plurality of program codes. Two or three of the cropping unit 120, the processing unit 130 and the analyzing unit 150 may be integrated to be one piece.

The processing unit 130 includes a plurality of detectors, such as a first detector 131, a second detector 132, and etc. The first detector 131 and the second detector 132 are used for performing different image detections, such as people detection, objection detection, motion detection and car detection, etc.

The operation of the image processing system 100 is illustrated by a flowchart. Please refer to FIG. 2, which shows a flowchart of an image processing method according to one embodiment. The sequence of the steps is not limited to the embodiment shown in the FIG. 2. In one embodiment, some of the steps may be simultaneously performed.

As shown in FIG. 1, the image processing method is used for processing the image data D1. The image data D1 may be a video or a static frame.

Figure 2:
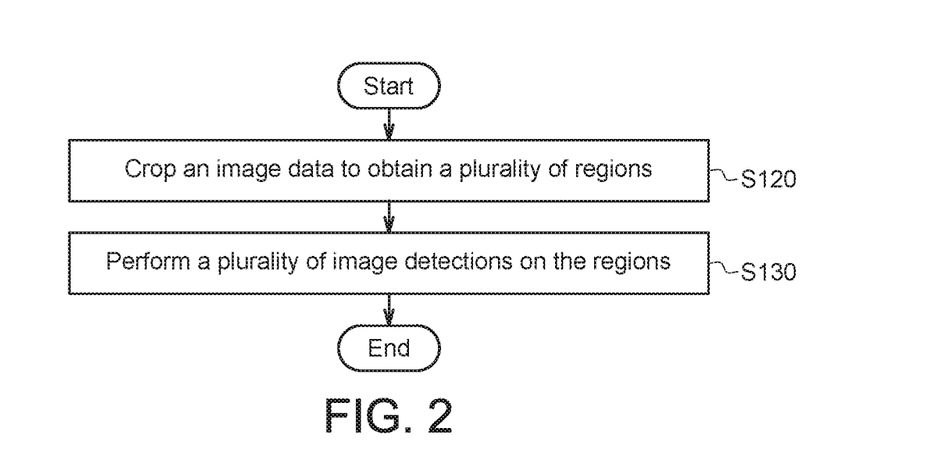
FIG. 2 shows a flowchart of an image processing method according to one embodiment.

In the step S120, the cropping unit 120 crops the image data D1 to obtain a plurality of regions. Please refer to FIG. 3, which shows the image data D1 according to one embodiment. The cropping unit 120 crops image data D1 to obtain a region R11, a region R12 and a region R13. In one embodiment, the cropping unit 120 may crop the image data D1 according to the current content of the image data D1; in another embodiment, the cropping unit 120 may crop the image data according to a predetermined setting.

Figure 3:
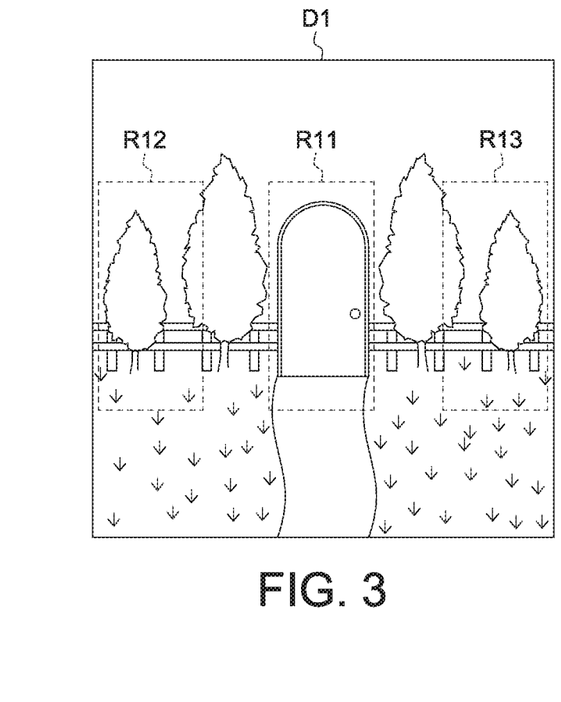
FIG. 3 shows an image data according to one embodiment.

As shown in FIG. 3, the region R11, the region R12 and the region R13 have the same size and do not overlap with each other. The union of the region R11, the region R12 and the region R13 is not the whole frame of the image data D1. In the image data D1 of FIG. 3, a home courtyard is captured. The front door is shown in the region R11, and the trees are shown in the region R12 and the region R13.

In the step S130, the processing unit 130 performs various image detections on those regions. For example, human or pets may pass through the front door and will be shown in the region R11, so the first detector 131 of the processing unit 130 performs the motion detection on the region R11. The trees shown in the region R12 and the region R13 are easily swung by winds, so the people detection is performed on the region R12 and the region R13 instead of the motion detection.

As such, in a complex frame, appropriate image detections may be respectively performed on different regions for increasing the detection accuracy and reducing false positives/negatives.

Figure 4:
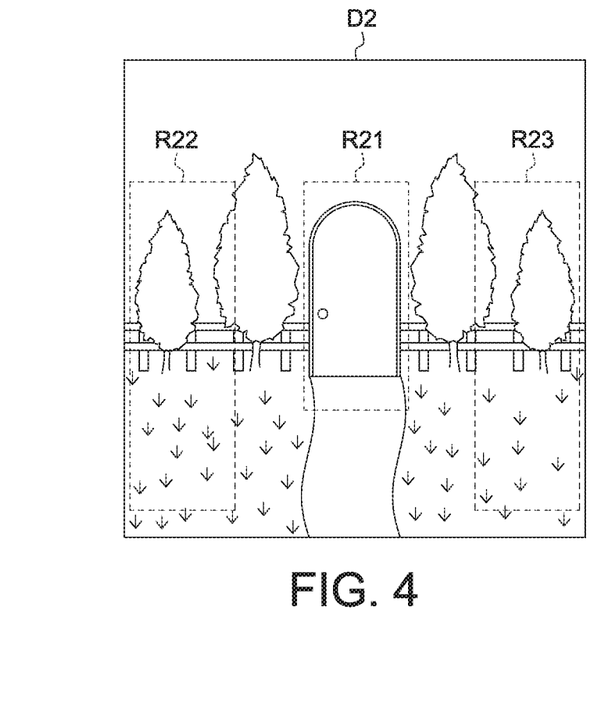
FIG. 4 shows an image data according to another embodiment.

Please refer to FIG. 4, which shows an image data D2 according to another embodiment. In FIG. 4, the size of a region R21 is less than a size of a region R22 or a region R23. That is to say, the regions R21, R22, R23 are not limited to be having the same size. The regions R21, R22, R23 may have different sizes for various scenes.

Figure 5:
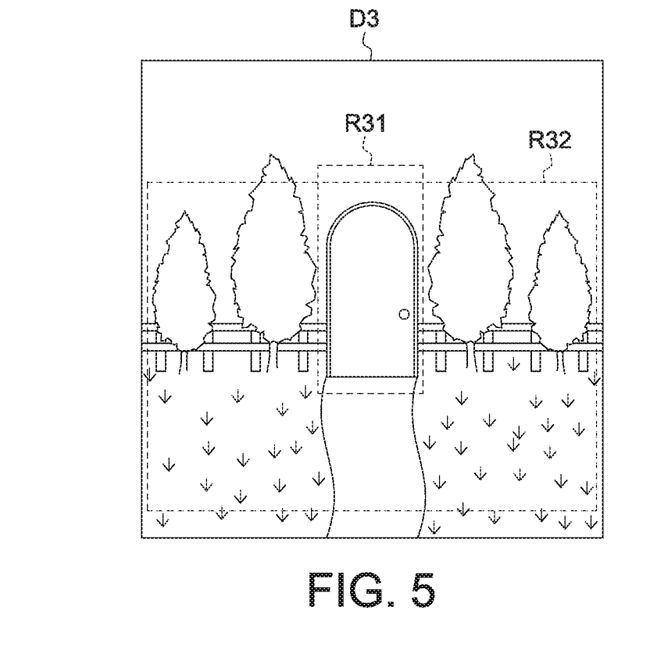
FIG. 5 shows an image data according to another embodiment.

Please refer to FIG. 5, which shows an image data D3 according to another embodiment. In FIG. 5, a region R31 and a region R32 are partially overlapped with each other. Only part of the region R31 overlaps with the region R32. The regions R31, R32 are not separated with each other. For various scenes, the region R31 and the region R32 may be partially overlapped, and different image detections are performed on the region R31 and the region R32.

Figure 6:
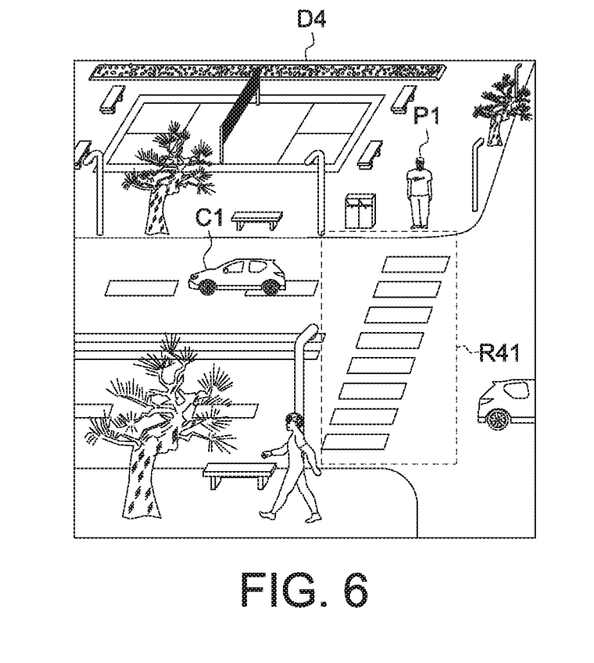
FIG. 6 shows an image data according to another embodiment.

Please refer to FIG. 6, which shows an image data D4 according to another embodiment. In FIG. 6, a zebra crossing on an intersection is shown in a region R41. Pedestrians P1 and cars C1 may cross this intersection. Therefore, the processing unit 130 may simultaneously perform the people detection and the car detection on the region R41, for obtaining the traffic status on the region R41. That is to say, the number of the image detections performed on one region R41 is not limited to be one. Base on various needs, two or more different image detections may be performed on one region R41.

Figure 7:
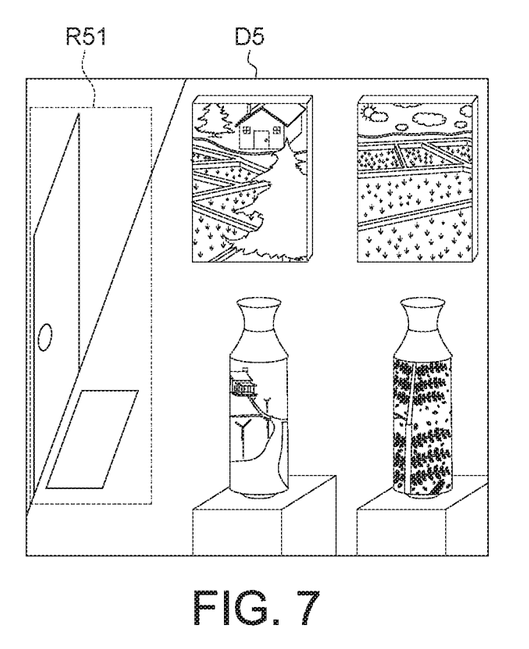
FIG. 7 shows an image data according to another embodiment.

Please refer to FIG. 7, which shows an image data D5 according to another embodiment. In the FIG. 7, an entrance to a museum is shown in a region R51. During the opening hours, the number of people entering the museum is needed to be counted to control the number of admission. During the closing hours, whether there is an intruder is needed to be detected. Therefore, the processing unit 130 may perform the people detection on the region R51 during the opening hours to accurately count the number of admission; and the processing unit 130 may perform the motion detection on the region R51 during the closing hours to detect whether there is an intruder. That is to say, one region R51 is not limited to be performed only one image detection. For various needs, the region R51 can be performed different image detections at different time.

Figure 8:
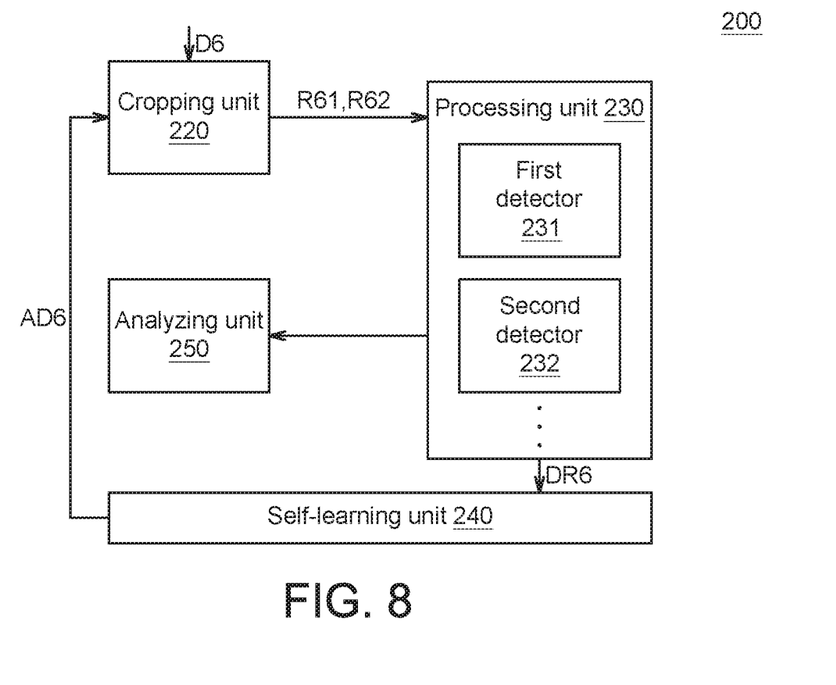
FIG. 8 shows an image processing system according to another embodiment.

Please refer to FIG. 8, which shows an image processing system 200 according to another embodiment. In one embodiment, the detection accuracy of the image processing system 200 may be improved via the self-learning technology. As shown in FIG. 8, the image processing system 200 includes a cropping unit 220, a processing unit 230, a self-learning unit 240 and an analyzing unit 250. The processing unit 230 includes a first detector 231, a second detector 232, and etc. The cropping unit 220, the processing unit 230, the analyzing unit 250, the first detector 231 and the second detector 232 are respectively similar to the cropping unit 120, the processing unit 130, the analyzing unit 150, the first detector 131 and the second detector 132 described above, and similarities are not repeated here. The operation of the image processing system 200 is illustrated by a flowchart. Please refer to FIG. 9, which shows a flowchart of an image processing method according to another embodiment. The step S220 and the step S230 are similar to the step S120 and the step S130, and the similarities are not repeated here.

Figure 10A:
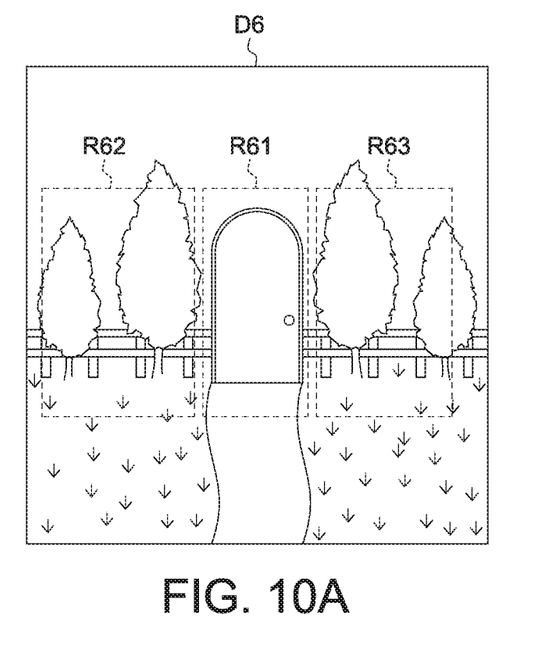
FIGS. 10A to 10B show an image data according to one embodiment.
Figure 10B:
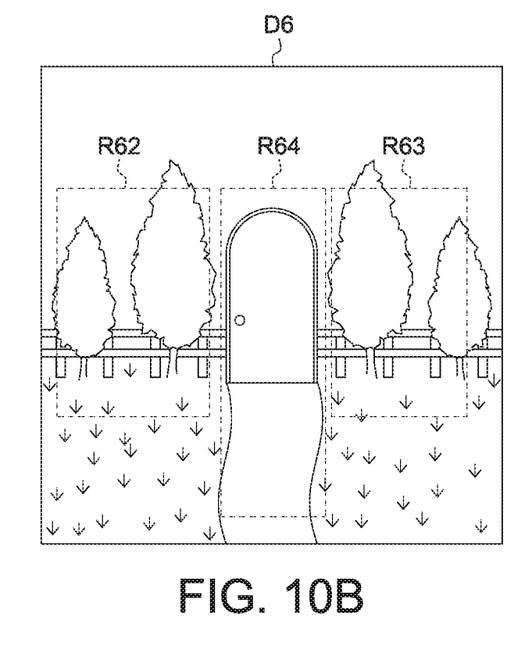

In the step S240, the self-learning unit 240 adjusts the regions according to a result of the image detections. Please refer FIGS. 10A to 10B, which show an image data D6 according to one embodiment. As shown in FIG. 8 and FIG. 10A, the processing unit 230 performs the motion detection on the regions R61, R62, R63. The processing unit 230 obtains a result DR6 and transmitted the result DR6 to the self-learning unit 240. The self-learning unit 240 performs a self-learning algorithm according to the result DR6. If a convergence condition is satisfied, then an adjusting command AD6 is outputted to the cropping unit 220. The cropping unit 220 changes the region R61 of the FIG. 10A to be the region R64 of the FIG. 10B according to the adjusting command AD6, such that the image detection can be performed on the corridor also. That is to say, the size and the location of the region R61 can be adjusted via the self-learning technology to improve the detection accuracy.

Figure 11:
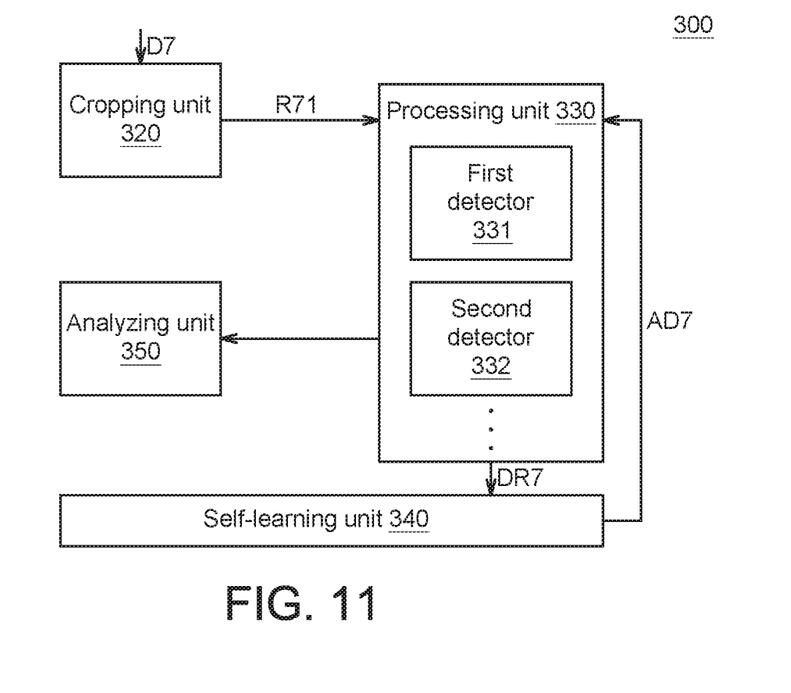
FIG. 11 shows an image processing system according to another embodiment.

Please refer to FIG. 11, which shows an image processing system 300 according to another embodiment. As shown in FIG. 11, the image processing system 300 includes a cropping unit 320, a processing unit 330, a self-learning unit 340 and an analyzing unit 350. The processing unit 330 includes a first detector 331, a second detector 332, and etc. The cropping unit 320, the processing unit 330, the analyzing unit 350, the first detector 331 and the second detector 332 are respectively similar to the cropping unit 120, the processing unit 130, the analyzing unit 150, the first detector 131 and the second detector 132, and the similarities are not repeated here. The operation of the image processing system 300 is illustrated by a flowchart. Please refer to FIG. 12, which shows a flowchart of an image processing method according another embodiment. The step S320 and the step S330 are similar to the step S120 and the step S130, and the similarities are not repeated here.

Figure 13:
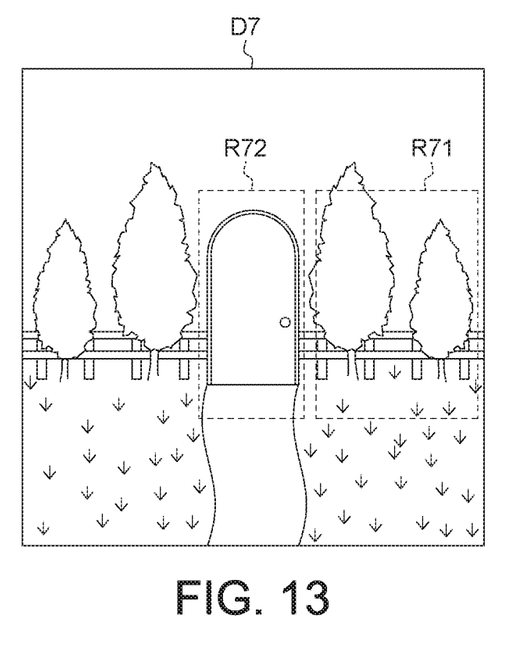
FIG. 13 shows an image data according to another embodiment.

In the step S350, the self-learning unit 340 adjusts the image detections according to a result of the image detections. Please refer to FIG. 13, which shows an image data D7 according to another embodiment. As shown in FIGS. 11 and 13, the processing unit 330 performs the motion detection on the regions R71, R72. The processing unit 330 obtains a result DR7 and transmits the result RD7 to the self-learning unit 340. The self-learning unit 340 performs a self-learning algorithm according to the result DR7. If a convergence condition is satisfied, then an adjusting command AD7 is outputted to the processing unit 330. The processing unit 330 performs the people detection instead of the motion detection according to the adjusting command AD7 for preventing the detection error caused from the shaking of the branches. That is to say, the image detection can be adjusted via the self-learning technology to improve the detection accuracy.

Figure 9:
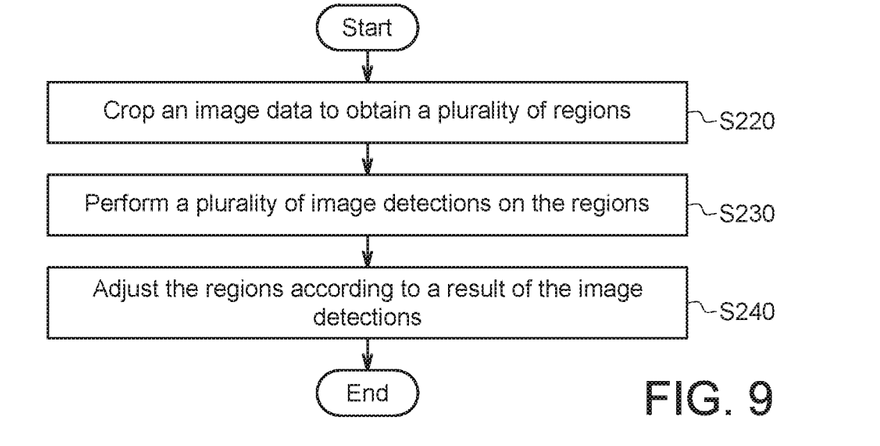
FIG. 9 shows a flowchart of an image processing method according to another embodiment.
Figure 12:
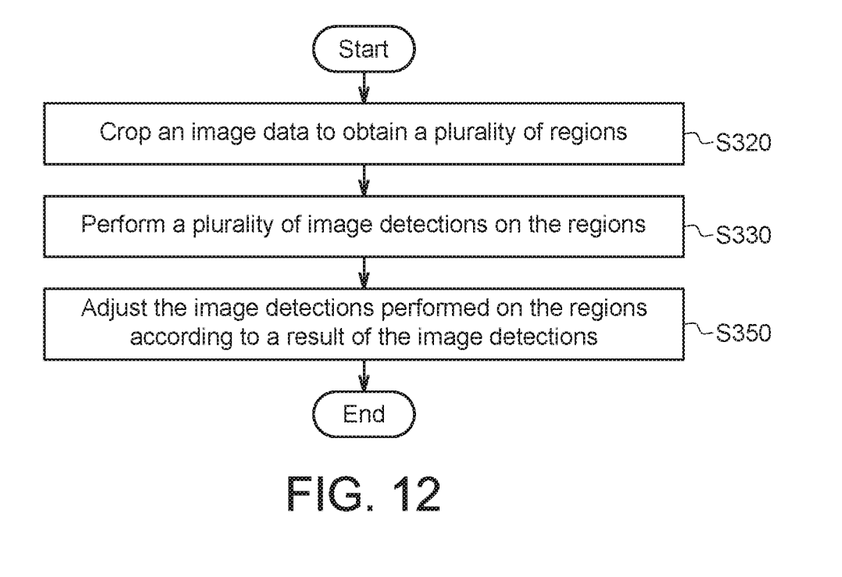
FIG. 12 shows a flowchart of an image processing method according to another embodiment.

In one embodiment, the image processing method may include the step S240 of the FIG. 9 and the step S350 of the FIG. 12. The order of the step S240 and the step S350 is not limited here. In fact, the step S240 and the step S350 may be performed simultaneously.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image processing method, comprising: cropping an image data to obtain a plurality of regions; and performing a plurality of image detections on the plurality of regions; performing a self-learning algorithm for adjusting at least one of the plurality of image detections performed on the plurality of regions according to a result of the plurality of image detections, wherein the plurality of image detections include at least two of a people detection, an objection detection, a motion detection and a car detection, wherein the motion detection is used to detect a motion status of at least one of the regions of the image data.

2. The image processing method according to claim 1, wherein in the step of performing the plurality of image detections on the plurality of regions, the plurality of image detections performed on two of the plurality of regions are different, or two of the plurality of image detections performed on one of the plurality of regions are different.

3. The image processing method according to claim 1, wherein two of the plurality of regions are partially overlapping or separated with each other.

4. The image processing method according to claim 1, wherein the image data is a video, and the plurality of image detections, which are performed on one of the plurality of regions at different times, are different.

5. The image processing method according to claim 1, further comprising:

adjusting the plurality of regions according to a result of the plurality of image detections.

6. An image processing system, comprising:
a cropping unit for cropping an image data to obtain a plurality of regions; and
a processing unit for performing a plurality of image detections on the plurality of regions;
a self-learning unit for adjusting at least one of the plurality of image detections performed on the plurality of regions according to a result of the plurality of image detections,
wherein the plurality of image detections include at least two of a people detection, an objection detection, a motion detection and a car detection, wherein the motion detection is used to detect a motion status of at least one of the regions of the image data.

7. The image processing system according to claim 6, wherein the plurality of image detections performed on two of the plurality of regions by the processing unit are different, or two of the plurality of image detections performed on one of the plurality of regions by the processing unit are different.

8. The image processing system according to claim 6, wherein two of the plurality of regions are partially overlapping or separated with each other.

9. The image processing system according to claim 6, wherein the image data is a video, and the plurality of image detections, which are performed on one of the plurality of regions by the processing unit at different times, are different.

10. The image processing system according to claim 6, further comprising:
a self-learning unit for adjusting the plurality of regions according to a result of the plurality of image detections.

* * * * *